(12) United States Patent
Moroni Stampa et al.

(10) Patent No.: US 12,124,913 B2
(45) Date of Patent: Oct. 22, 2024

(54) ACCESS AND/OR PRESENCE CONTROL SYSTEM

(71) Applicant: ALERT-GENIUS S.R.L., Alghero (IT)

(72) Inventors: Andrea Moroni Stampa, Alghero (IT); Matteo Cocchi, Alghero (IT)

(73) Assignee: ALERT-GENIUS S.R.L., Alghero (IT)

(*) Notice: Subject to any disclaimer, the term of this patent is extended or adjusted under 35 U.S.C. 154(b) by 0 days.

(21) Appl. No.: 18/019,597

(22) PCT Filed: Aug. 5, 2021

(86) PCT No.: PCT/IB2021/057187
§ 371 (c)(1),
(2) Date: Feb. 3, 2023

(87) PCT Pub. No.: WO2022/029671
PCT Pub. Date: Feb. 10, 2022

(65) Prior Publication Data
US 2023/0306212 A1    Sep. 28, 2023

(30) Foreign Application Priority Data
Aug. 6, 2020  (IT) .................. 102020000019543

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC .................................. G06K 19/0723
USPC ......................................... 235/451
See application file for complete search history.

(56) References Cited

U.S. PATENT DOCUMENTS

| | | | |
|---|---|---|---|
| 2004/0160323 A1 | 8/2004 | Stilp | |
| 2009/0051528 A1 | 2/2009 | Graichen | |
| 2010/0282541 A1* | 11/2010 | Renton | A62B 1/18 |
| | | | 182/234 |
| 2016/0107611 A1 | 4/2016 | Siswick et al. | |
| 2017/0113813 A1* | 4/2017 | Heuer | B64D 45/00 |
| 2017/0161530 A1* | 6/2017 | Turner | G01S 5/017 |
| 2018/0370360 A1* | 12/2018 | Hannon | H04W 4/00 |

(Continued)

FOREIGN PATENT DOCUMENTS

| | | |
|---|---|---|
| FR | 2798691 | 3/2001 |
| FR | 3041460 | 3/2017 |
| WO | 2014/023715 | 2/2014 |

*Primary Examiner* — Allyson N Trail
(74) *Attorney, Agent, or Firm* — Bauer & Joseph

(57) ABSTRACT

Portable RFID device (300), usable in an access and/or presence control system, comprising a radio frequency transmitter module (305) connected to an accelerometer (315) that is configured to detect movements of the portable RFID device (300), wherein the portable RFID device (300) is configured to be powered by a battery (325), wherein the accelerometer (315) is configured to send to the radio frequency transmitter module (305) a value of detected acceleration of the portable RFID device (300), and the radio frequency transmitter module (305) is configured to recognize when said value of detected acceleration is higher than a minimum threshold and, in this case, to activate for a transmission period a transmission of a radio frequency signal including an identification code.

6 Claims, 3 Drawing Sheets

(56) References Cited

U.S. PATENT DOCUMENTS

| | | |
|---|---|---|
| 2019/0338562 A1 | 11/2019 | Koya et al. |
| 2019/0338563 A1 | 11/2019 | Anzai |
| 2020/0064960 A1* | 2/2020 | Munemoto ............. G06F 18/24 |
| 2020/0156591 A1 | 5/2020 | Arakawa et al. |
| 2020/0219338 A1 | 7/2020 | Chen et al. |
| 2021/0104138 A1* | 4/2021 | Soto ......................... G07C 9/29 |
| 2021/0142666 A1* | 5/2021 | Beaudry ................. H04W 4/02 |
| 2021/0279826 A1* | 9/2021 | Kaelin ............... G06Q 30/0645 |
| 2022/0057832 A1* | 2/2022 | von Badinski ...... G04G 21/025 |
| 2022/0149016 A1* | 5/2022 | Plank ..................... H01S 5/423 |
| 2023/0306212 A1* | 9/2023 | Moroni Stampa ........................... G07C 9/00182 |
| 2024/0001141 A1* | 1/2024 | Bruhat ................. A61B 5/4839 |
| 2024/0066233 A1* | 2/2024 | Ploch ................ A61M 5/31525 |

\* cited by examiner

ACCESS AND/OR PRESENCE CONTROL SYSTEM

The present invention relates to an access and/or presence control system, as well as the portable RFID device used therein, that allows in a simple, reliable, efficient and inexpensive way to control access and/or presence of people, animals and/or movable objects in an area subject to access authorisation, such as indoor areas, for instance homes, offices, factories, hospitals, theatres and museums, and delimited outdoor areas, such as gardens and parks.

It is known that, in order to detect the presence of unauthorised persons inside rooms with controlled access, such as for example a private house, anti-intrusion systems have been developed in the prior art, which are generally activated by those who are authorised to access them (e.g. those who lives or works in the home) when leaving and which are disabled upon the return of those who are authorised to access it. These systems are usually based on the surveillance of the area under control that is carried out by means of cameras and/or motion sensors delimiting the perimeter spaces of the area, for instance a private home. An example of such systems is disclosed in WO 2014/023715 A1.

However, such systems suffer from some drawbacks.

First of all, they are not easy to use. In fact, movement detection systems, such as those employed in anti-intrusion systems, are not capable to discriminate persons authorised to access by unauthorised persons. This implies that the anti-intrusion system must be disabled during the periods in which the controlled areas are frequented by at least one authorised person, who may be accompanied by an unauthorised person or not.

Also, such systems are not entirely reliable. In fact, where unauthorised access occurs during a period in which the anti-intrusion system is disabled, it is incapable to detect, whereby the anti-intrusion system is unreliable and inefficient.

To solve these problems, some security systems based on RFID technology have been developed in the prior art, such as for instance in documents US 2004/0160323 A1 and FR 3041460 A1.

However, even such systems suffer from some drawbacks.

In particular, they are rather complex and expensive.

In addition, the RFID transponders carried by authorised persons require a high power of radiation by the RFID readers and a high power consumption on the RFID transponders, that greatly reduces the life of the power supply batteries of the RFID transponders causing malfunction of the systems, which consequently are also unreliable and inefficient.

The object of the present invention is therefore to allow in a simple, reliable, efficient and inexpensive way, to control access and/or presence of people, animals and/or movable objects in an area subject to access authorisation, such as indoor areas, for instance homes, offices, factories, hospitals, theatres and museums, and delimited outdoor areas, such as gardens and parks.

It is specific subject-matter of the present invention a portable RFID device configured to communicate with at least one detection apparatus connected to a central processing and control unit of a system configured to detect presence of unauthorised subjects in an area under control, wherein the portable RFID device comprises a radio frequency transmitter module connected to an accelerometer that is configured to detect movements of the portable RFID device, wherein the portable RFID device is configured to be powered by a battery, wherein the accelerometer is configured to send to the radio frequency transmitter module a value of detected acceleration of the portable RFID device, and the radio frequency transmitter module is configured to recognise when said value of detected acceleration is higher than a minimum threshold and, in this case, to activate for a transmission period a transmission of a radio frequency signal including an identification code According to another aspect of the invention, the radio frequency transmitter module may be configured to transmit said radio frequency signal in encrypted form, optionally through a dynamic encryption technique.

According to a further aspect of the invention, the radio frequency transmitter module may be provided with a memory configured to store said minimum threshold and/or said identification code.

According to an additional aspect of the invention, the accelerometer may comprise or consists of a three or more axis motion sensor.

According to another aspect of the invention, the battery may be rechargeable.

According to a further aspect of the invention, the portable RFID device may have a container wearable by a person or animal and/or mountable on a movable object.

According to an additional aspect of the invention, said transmission period may be adjustable.

According to another aspect of the invention, the portable RFID device may further comprise a LED configured to flash when the radio frequency transmitter module transmits said radio frequency signal.

According to a further aspect of the invention, the portable RFID device may further comprise a button operatable by a user that is connected to the radio frequency transmitter module and that is configured, when activated, to cause the activation of transmission of said radio frequency signal.

It is still specific subject-matter of the present invention an access and/or presence control system, configured to detect presence of unauthorised subjects in an area under control, comprising a central processing and control unit connected to at least one detection apparatus configured to communicate with at least one portable RFID device associated with a subject authorised to access the area under control, wherein said at least one portable RFID device is the portable RFID device as described above, wherein said at least one detection apparatus comprises a RFID reading device connected to a presence and/or access detection device, wherein the RFID reading device is configured to receive a radio frequency signal emitted by said at least one portable RFID device in at least one portion of the area under control, to extract a code from said radio frequency signal and to compare said extracted code with one or more identification codes associated with one or more subjects authorised to access at least said portion of the area under control, wherein the presence and/or access detection device is configured to detect a presence and/or access of at least one subject in said at least one portion of the area under control and to consequently send a presence and/or access detection signal to the central processing and control unit, wherein, when the RFID reading device ascertains that said extracted code corresponds to one of said one or more identification codes associated with one or more subjects authorised to access at least said portion of the area under control, the RFID reading device is configured to inhibit for an inhibition period sending of said presence and/or access detection signal to the central processing and control unit, wherein the central processing and control unit is configured to generate an audible and/or visual alarm when it receives said presence and/or access detection signal.

According to another aspect of the invention, the RFID reading device may be configured to receive said radio frequency signal in encrypted form and to decrypt it, optionally through a dynamic encryption technique.

According to a further aspect of the invention, said inhibition period may be adjustable.

According to an additional aspect of the invention, the presence and/or access detection device may be configured to detect an access by at least one subject through a passage to said at least one portion of the area under control through detection of opening and/or closing of a barrier, optionally selected from the group comprising a door, a gate and a turnstile.

According to another aspect of the invention, the presence and/or access detection device may comprise one or more sensors selected from the group comprising a motion sensor, an infrared sensor, a contact sensor, and a proximity sensor.

According to a further aspect of the invention, the central processing and control unit may be provided with at least one communication device configured to send an alarm message to at least one device of at least one operator, optionally an email message and/or a message on an app installed on a portable device, more optionally consisting of a tablet or smartphone, of said at least one operator.

The system according to the invention, that is based on the interaction of one or more detection apparatuses with portable RFID devices in such a way that the system emits an alarm signal conditioned on the non-reception of an acknowledgment signal emitted by a portable RFID device associated with an authorised subject, offers numerous advantages.

First of all, by synergistically combining the detection of movements (or, more generally, events related to the passage of a subject through a passage and/or within an area subject to access authorisation) with RFID recognition, it allows to keep the access and/or presence control system constantly operational even in presence of people, animals and movable objects (e.g. cleaning robots) authorised to access the area under control, reliably and efficiently discriminating between authorised subjects and unauthorised subjects.

Furthermore, the system according to the invention is extremely flexible in the modes of installation, being applicable in any context in which it is necessary to recognise the presence of subjects, authorised or not, in an area subject to access control, such as indoor areas, for instance homes, offices, factories, hospitals (e.g. by controlling the entrances and exits from an infectious disease ward), theatres and museums, and outdoor areas, such as gardens and parks.

Furthermore, the portable RFID devices, which are preferably active, carried by the authorised subjects and which send an identification code inhibiting the access and/or presence control system alarms, are implemented so as to minimise power consumption (thanks to an activation conditioned on the movement of the portable RFID devices) and thus to maintain a long life of the power battery with which they are equipped, optionally equal to at least 12 months or 18 months depending on the versions of the portable RFID device and the battery, thereby the access and/or presence control system, although simple and inexpensive, guarantees high reliability and operating efficiency.

Finally, both said one or more detection devices and portable RFID devices can be programmed and reprogrammed in a flexible way according to the needs of the application context and the contingent situation. By way of example, portable RFID devices can be replaced in case of loss or theft, removing the authorisation of portable RFID devices no longer used, and the authorisations associated with each portable RFID device can be changed (even in the absence of the device itself).

The present invention will be now described, for illustrative but not limiting purposes, according to its preferred embodiments, with particular reference to the Figures of the attached drawings, in which.

In the Figures identical reference numerals will be used for alike elements.

Figure 1:
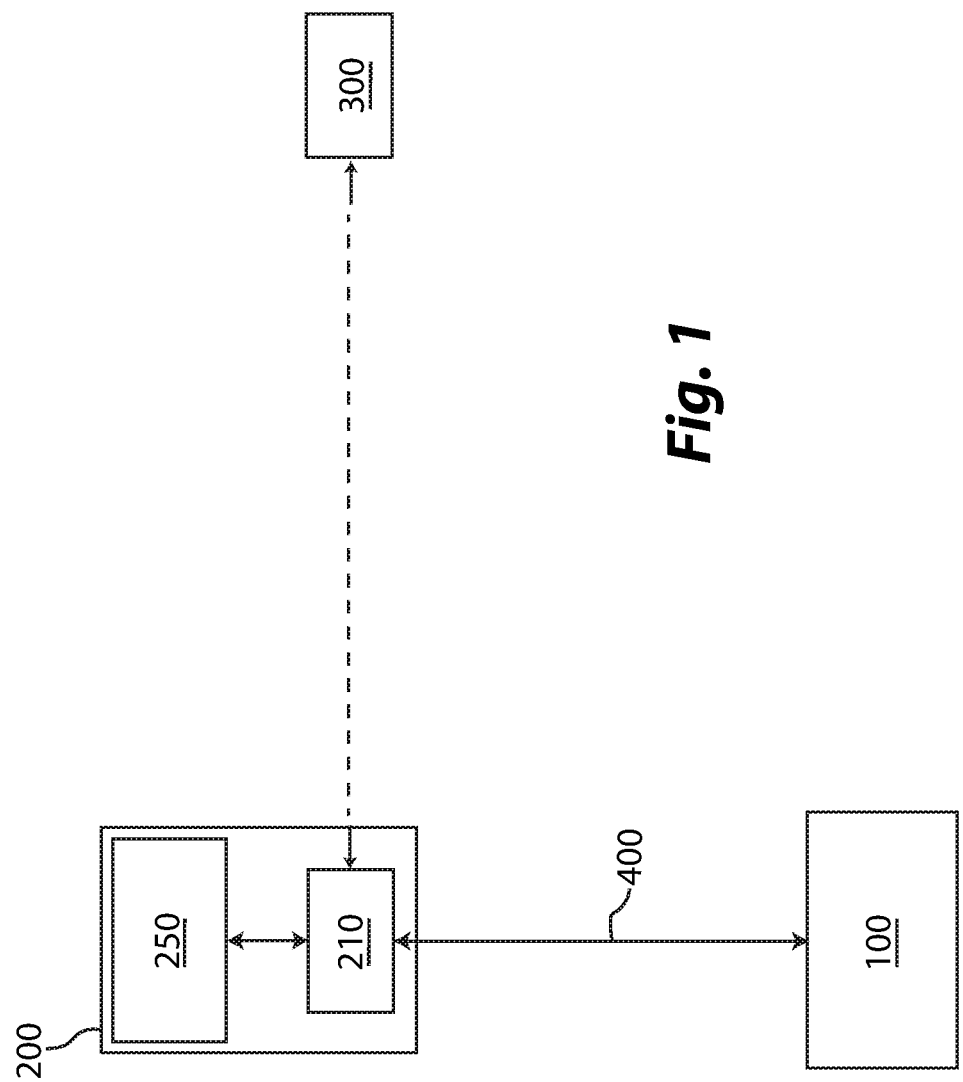
FIG. 1 shows a schematic block diagram of a preferred embodiment of the system according to the invention.

Referring to FIG. 1, it can be observed that a preferred embodiment of the anti-intrusion system according to the invention comprises a central processing and control unit 100 connected to a detection apparatus 200 configured to communicate with a portable RFID device 300. The anti-intrusion system according to the invention is configured to detect the presence of unauthorised subjects in an area subject to control. In other words, the portable RFID device 300 is configured to communicate with the detection apparatus 200 connected to the central processing and control unit 100 of the anti-intrusion system that is configured to detect the presence of unauthorised subjects in an area under control.

In this regard, although FIG. 1 shows only one detection apparatus 200 and only one portable RFID device 300, it must be noted that the access and/or presence control system according to the invention can comprise a plurality of detection apparatuses similar to the apparatus 200 shown in FIG. 1, each arranged in a sub-area that is part of the overall area subject to control, and a plurality of portable RFID devices, similar to the portable RFID device 300 shown in FIG. 1, each associated with a subject (person, animal or movable object) authorised to access the area subject to control.

In the preferred embodiment of the access and/or presence control system according to the invention, the central processing and control unit 100 is connected to the detection apparatus 200 through a wired connection 400. However, it should be noted that other embodiments of the invention may have the central processing and control unit 100 that is connected to at least one detection apparatus through a wireless connection.

The detection apparatus 200 comprises a RFID reading device 210 connected to a presence and/or access detection device 250. The RFID reading device 210 is configured to receive a radio frequency signal emitted by the portable RFID device 300 in at least one portion (i.e. a sub-area that is part) of the area subject to control and to process it in order to identify the presence of a code associated with a subject authorised to access such at least one portion of the area subject to control, wherein such subject can be a person, an animal or a movable object (e.g. a robot for cleaning the area subject to control control). The presence and/or access detection device 250, that advantageously includes at least one sensor, is configured to detect a presence and/or access of at least one subject moving in or accessing at least one portion (i.e. a sub-area that is part) of the area subject to control, wherein such subject can be a person, an animal or a movable object (e.g. a robot for cleaning the area subject to control). In particular, when the RFID reading device 210 recognises in the radio frequency signal received from the portable RFID device 300 a code associated with an authorised subject, the same RFID reading device 210 temporarily disables the detection of presence and/or access carried out by the presence and/or access detection device 250 that, in the absence of an authorised code in the radio frequency signal, would cause the central processing and control unit 100 to emit a visual and/or acoustic alarm; in other words, the RFID reading device 210 causes the temporary inhibition of the presence and/or access detection device 250 when the former recognises a code associated with an authorised subject in the radio frequency signal received from the portable RFID device 300.

In general, the presence and/or access detection device 250 comprises or consists of at least one sensor configured to detect events related to the passage of one or more subjects (such as people and/or animals and/or movable objects) through a passage and/or within an area subject to access authorisation, that advantageously outputs a binary signal alternatively indicating the presence and/or access of at least one subject or the lack of presence and/or access. By way of example, and not by way of limitation, the presence and/or access detection device 250 can be a sensor selected from the group comprising movement sensors (configured to detect a movement of a subject, e.g. infrared sensors), proximity sensors (configured to detect the presence of a subject in an proximity zone of the sensor under consideration), contact sensors (configured to detect the opening and/or closing of a door, gate or turnstile), temperature sensors and thermal cameras (configured to detect the temperature of a subject that is used to identify the presence and/or access of subjects having a body temperature not higher or lower than an authorisation threshold, whereby the detected temperature is used to authorise the subjects to be present and/or to access such at least one portion of the area subject to control only in the event that their body temperature is not higher or lower than the authorisation threshold).

The portable RFID device 300 is an active radiofrequency transmitter configured to detect the movement of the subject who carries it, preferably wearing it, and to send a radio frequency signal that encodes a code authorised for the presence and/or access to such at least one portion of the area subject to control that is associated to the subject that carries the same portable RFID device 300.

The central processing and control unit 100 is configured to receive from the detection apparatus 200 data relating to detections carried out by both the RFID reading device 210 and the presence and/or access detection device 250 and to possibly generate a consequent audible and/or visual alarm, through acoustic and/or visual signaling devices, in the event that such data correspond to the detection of the presence and/access of an unauthorised subject in the area subject to control. In particular, the central processing and control unit 100 can be provided with at least one communication device configured to send an alarm message to at least one device of at least one operator, such as an email message or a (optionally encoded) message on an app installed on a portable device (e.g. a tablet or a smartphone) of said at least one operator.

The access and/or presence control system according to the invention is always active and is configured to recognise the presence and/or access exclusively of one or more authorised subjects, identified through the code transmitted by the portable RFID device 300, in the area subject to control, generating an alarm in the case of detection of the presence of one or more unauthorised subjects. Moreover, the system according to the invention also allows to record the movements of one or more authorised subjects in the area subject to control, when there are two or more detection apparatuses 200 each one of which detects movements and RFID devices 300 in a respective sub-area that is part of the overall area subject to control.

Figure 2:
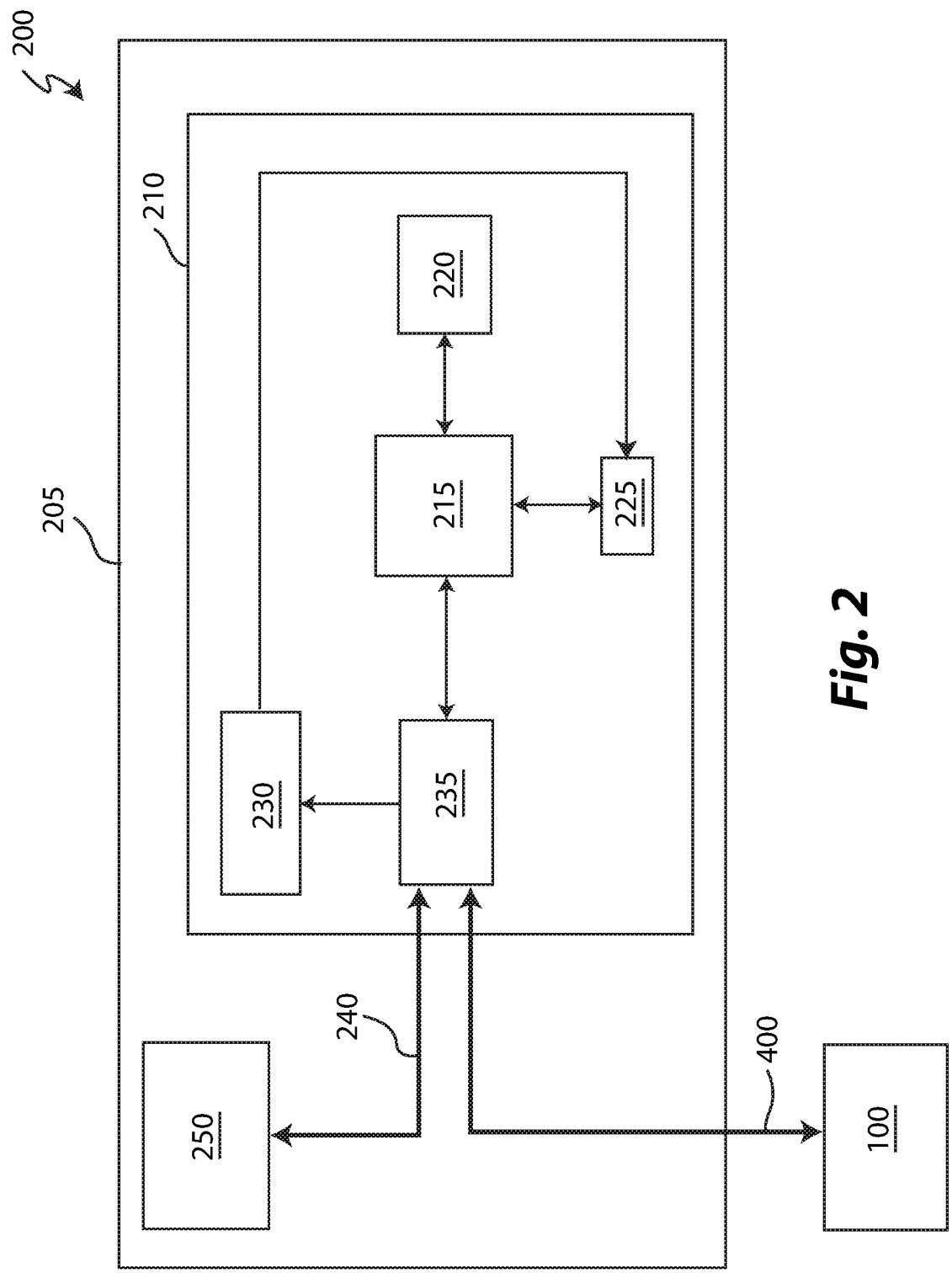
FIG. 2 shows a schematic block diagram of a detection apparatus of the system of FIG. 1.

With reference to FIG. 2, it can be observed that, in the preferred embodiment of the access and/or presence control system according to the invention, the RFID reading device 210 and the presence and/or access detection device 250 are housed in a single container 205 of the detection apparatus 200. The RFID reading device 210 comprises a processing unit 215, provided with a memory 220 connected to a radio frequency receiver module 225, optionally configured to communicate according to one of the WiFi, Bluetooth, Bluetooth Low Energy (BLE), Zigbee, Z-Wave, LoRa and NB-IoT standards. A power supply stage 230, connected to an I/O interface 235, optionally comprising a terminal block, through which it is connected to the mains (not shown), supplies power to all the components of the RFID reading device 210. Also the processing unit 215 is connected to the I/O interface 235 to provide data relating to the detections to the central processing and control unit 100 through a connection 400 also connected to the I/O interface 235. The presence and/or access detection device 250 is also connected to I/O interface 235.

The operation of the detection apparatus 200 of the preferred embodiment of the access and/or presence control system according to the invention is as follows. When the radio frequency receiver module 225 receives a radio frequency signal emitted by a portable RFID device 300, it sends it to the processing unit 215 that processes it to extract a code that then compares with the identification codes associated to authorised subjects stored in the memory 220. When it detects a presence and/or access of a subject, the presence and/or access detection device 250 transmits a presence and/or access detection signal to the I/O interface 235.

In the case where, on the basis of the comparison made, the processing unit 215 ascertains that the extracted code corresponds to one of the identification codes associated to authorised subjects, the same processing unit 215 inhibits for an inhibition period forwarding from the I/O interface 235 to the central processing unit 100 any presence and/or access detection signal sent by the presence and/or access detection device 250. In particular, such inhibition period is optionally adjustable. If the radio frequency receiver module 225 receives further radio frequency signals emitted by the same portable RFID device 300 or by other portable RFID devices and, on the basis of the comparison made, the processing unit 215 ascertains that the extracted code corresponds to one of the identification codes associated with authorised subjects, the processing unit 215 reinitializes the inhibition period thus prolonging the overall inhibition interval.

In other words, the presence and/or access detection device 250 and the radio frequency receiver module 225 are always active: if the processing unit 215 ascertains that the extracted code corresponds to one of the identification codes associated to authorised subjects, then it inhibits for an inhibition period the forwarding from the I/O interface 235 to the central processing unit 100 of any presence and/or access detection signal sent by the presence and/or access detection device 250, for an optionally adjustable inhibition period.

Figure 3:
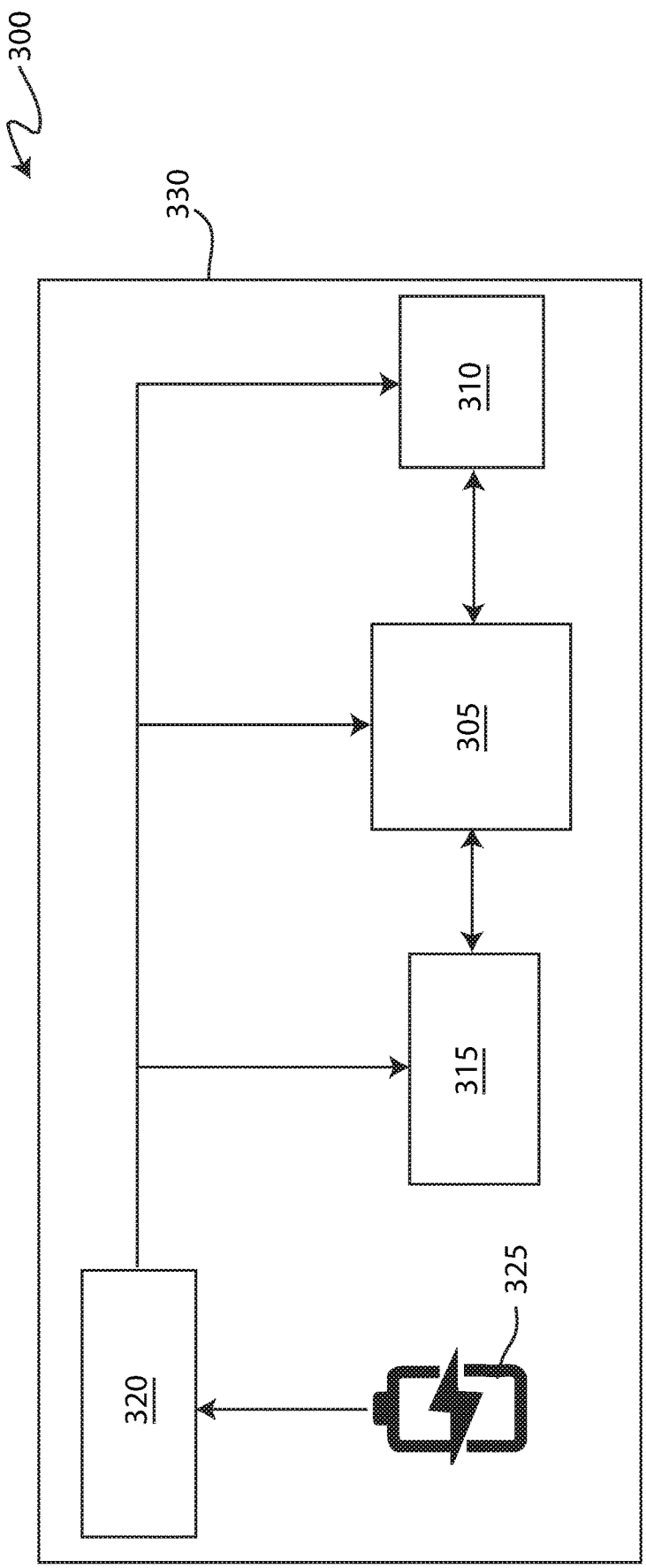
FIG. 3 shows a schematic block diagram of a portable RFID device of the system of FIG. 1.

With reference to FIG. 3, it can be observed that, in the preferred embodiment of the access and/or presence control system according to the invention, the portable RFID device 300 comprises a radio frequency transmitter module 305, optionally configured to communicate according to one of the WiFi, Bluetooth, Bluetooth Low Energy (BLE), Zigbee, Z-Wave, LoRa and NB-IoT standards, that is provided with a memory 310. The radio frequency transmitter module 305 is provided with a microcontroller and a radio frequency transmitter module, wherein the microcontroller is connected to an accelerometer 315, optionally comprising a three axis motion sensor, that is configured to detect movements of the portable RFID device 300. A power supply stage 320, connected to a battery 325, optionally rechargeable, provides power to all the components of the portable RFID device 300, which are optionally mounted on a single printed circuit. In particular, the components of the portable RFID device 300, including the battery 325, are housed in a container 330 wearable in a simple and comfortable way by a person or animal, or mountable in a simple and stable way on a movable object (e.g. a robot).

The operation of the portable RFID device 300 of the preferred embodiment of the access and/or presence control system according to the invention is as follows. The accelerometer 315 sends to the microcontroller of the radiofrequency transmitter 305 the measurement of the value of the detected acceleration (along one or more axes), i.e. of the acceleration of the movement of the portable RFID device 300: if the microcontroller recognises that the acceleration is higher than a minimum threshold (below which the portable RFID device 300 is considered substantially stationary), optionally stored in the memory 310, then the radio frequency transmitter module is activated for a transmission period and transmits a radio frequency signal including an identification code, advantageously stored in the memory 310. In particular, such transmission period is optionally adjustable. Said minimum threshold (as well as the transmission power) is optionally adjustable and, in this case, is advantageously adjusted during the testing phase of the portable RFID device 300. The identification code stored in the memory 310 can be advantageously updated, through the detection apparatus 200, if equipped with a radiofrequency transmitter, and/or through a different configurator transmitter apparatus, optionally through an app installed on a configurator transmitter apparatus consisting of a portable device of at least one operator, more optionally consisting of a tablet or smartphone. Optionally, the portable RFID device 300 can be provided with a LED controlled by the microcontroller of the radio frequency transmitter 305 so as to flash when the radio frequency transmitter module is active (i.e. when the radio frequency transmitter 305 is transmitting a radio frequency signal).

Thanks to the activation conditioned on the movement of the portable RFID device 300, this guarantees very low energy consumption, allowing the battery 325 to last for a long time, optionally equal to at least 12 months.

Optionally, the portable RFID device 300 may be provided with a button operatable by a user that is connected to the microcontroller of the radio frequency transmitter 305 and that, when operated, causes the radio frequency transmitter module to be activated for the transmission period and the transmission of the radio frequency signal including the identification code; more optionally, the button can be external to the container 330 and can be connected to the microcontroller of the radio frequency transmitter 305 through a wired connection.

Advantageously, the radio frequency communications between the portable RFID device 300 and the detection apparatus 200 are encrypted, thereby the radio frequency signal transmitted by the radio frequency transmitter 305 is encrypted through a dynamic encryption technique, i.e. with a cryptographic key that changes at each transmission (i.e. at each reception by the radio frequency receiver module 225 of the detection apparatus 200).

In some embodiments, the access and/or presence control system according to the invention can be provided with at least one detection apparatus 200 comprising a device 250 for detecting movement of a subject and/or at least one detection apparatus 200 comprising a presence and/or access detection device that is configured to detect the access of a subject through an passage by detecting the opening and/or closing of a barrier, such as a door, a gate or a turnstile; in this case, the presence and/or access detection device can comprise a contact sensor and/or a proximity sensor.

Further embodiments of the access and/or presence control system according to the invention can have at least one detection apparatus 200 that comprises, in combination with the radio frequency receiver module 225, a radio frequency illuminator module configured to transmit a coded interrogation signal capable to power passive radiofrequency transponders (or tags) possibly illuminated by the radiofrequency illuminator module to make them emit a radiofrequency response signal containing an identification code that is received by the radio frequency receiver module 225 and processed by the processing unit 215 as described above.

Other embodiments of the access and/or presence control system according to the invention may have at least one detection apparatus 200 that comprises, alternatively to or in combination with the radio frequency receiver module 225, a radio frequency transceiver module configured to transmit a coded interrogation signal capable to power passive radiofrequency tags possibly illuminated by the radiofrequency transceiver module and to receive a radio frequency response signal containing an identification code from such passive tags and possibly also radiofrequency signals transmitted by one or more portable RFID devices 300 like the one shown in FIG. 3.

The preferred embodiments of this invention have been described and a number of variations have been suggested hereinbefore, but it should be understood that those skilled in the art can make other variations and changes without so departing from the scope of protection thereof, as defined by the attached claims.

The invention claimed is:

1. A control system, configured to detect presence of unauthorised subjects in an area under control, comprising a central processing and control unit (100) connected to at least one detection apparatus (200) configured to communicate with at least one portable RFID device (300) associated with a subject authorised to access the area under control, wherein said at least one portable RFID device comprises a radio frequency transmitter module (305) connected to an accelerometer (315) that is configured to detect movements of the portable RFID device (300), wherein the portable RFID device (300) is configured to be powered by a battery (325), wherein the accelerometer (315) is configured to send to the radio frequency transmitter module (305) a value of detected acceleration of the portable RFID device (300), and the radio frequency transmitter module (305) is configured to recognize when said value of detected acceleration is higher than a minimum threshold and, in this case, to activate for a transmission period a transmission of a radio frequency signal including an identification code, wherein said at least one detection apparatus (200) comprises a RFID reading device (210) connected to a detection device (250), wherein the RFID reading device (210) is configured to receive a radio frequency signal emitted by said at least one portable RFID device (300) in at least one portion of the area under control, to extract a code from said radio frequency signal and to compare said extracted code with one or more identification codes associated with one or more subjects authorised to access at least said portion of the area under control, wherein the detection device (250) is configured to detect a presence and/or access of at least one subject in said at least one portion of the area under control and to consequently send a detection signal to the central processing and control unit (100), wherein, when the RFID reading device (210) ascertains that said extracted code corresponds to one of said one or more identification codes associated with one or more subjects authorised to access at least said portion of the area under control, the RFID reading device (210) is configured to inhibit for an inhibition period sending of said detection signal to the central processing and control unit (100), wherein the central processing and control unit (100) is configured to generate an alarm when it receives said detection signal.

2. The control system according to claim 1, wherein the RFID reading device (210) is configured to receive said radio frequency signal in encrypted form and to decrypt it.

3. The control system according to claim 1, wherein said inhibition period is adjustable.

4. The control system according to claim 1, wherein the detection device (250) is configured to detect an access by at least one subject through a passage to said at least one portion of the area under control through detection of opening and/or closing of a barrier, selected from the group comprising a door, a gate and a turnstile.

5. The control system according to claim 1, wherein the detection device (250) comprises one or more sensors selected from the group comprising a motion sensor, an infrared sensor, a contact sensor, and a proximity sensor.

6. The control system according to claim 1, wherein the central processing and control unit (100) is provided with at least one communication device configured to send an alarm message to at least one device of at least one operator.

* * * * *